United States Patent
Atkinson et al.

(10) Patent No.: US 6,177,504 B1
(45) Date of Patent: Jan. 23, 2001

(54) SEALING MATERIAL

(75) Inventors: Alan William Atkinson, Nr Rugby; Stephen Peter Bond; Darryl Alfred Turland, both of Rugby; Paul Reuben Percival, Maidenhead, all of (GB)

(73) Assignee: Federal-Mogul Technology Limited, Rugby (GB)

( * ) Notice: Under 35 U.S.C. 154(b), the term of this patent shall be extended for 0 days.

(21) Appl. No.: 09/341,801

(22) PCT Filed: Dec. 8, 1997

(86) PCT No.: PCT/GB97/03385

§ 371 Date: Sep. 7, 1999

§ 102(e) Date: Sep. 7, 1999

(87) PCT Pub. No.: WO98/31766

PCT Pub. Date: Jul. 23, 1998

(30) Foreign Application Priority Data

Jan. 17, 1997 (GB) .................................. 9700909
Apr. 16, 1997 (GB) .................................. 9707665

(51) Int. Cl.$^7$ ........................................... C08K 3/00
(52) U.S. Cl. ................. 524/496; 524/443; 524/493; 524/495
(58) Field of Search ..................... 524/443, 493, 524/495, 496

(56) References Cited

U.S. PATENT DOCUMENTS

| 5,232,973 | 8/1993 | Sakashita et al. | 524/492 |
| 5,240,766 | 8/1993 | Foster | 428/280 |
| 5,565,514 | 10/1996 | Carlberg | 524/494 |

FOREIGN PATENT DOCUMENTS

| 0 274 010 | 7/1988 | (EP) | F16J/15/12 |
| 2 093 054 | 8/1982 | (GB) | C08L/21/00 |
| 2 157 482 | 10/1985 | (GB) | H01M/4/96 |
| WO 92/02577 | 2/1992 | (WO) | C08K/3/04 |

OTHER PUBLICATIONS

WPI Abstract Accession No. 90–234427/31 & JP 020160891A (Nippon Gasket) Jun. 20, 1990 (see Abstract).

WPI Abstract Accession No. 88–129625/19 & JP 630072780A (Nippon Reinz) Apr. 2, 1988 (see Abstract).

Database WPI—Class A25, AN 94–313983, XP002058751 & JP06240271A (Idemitsu Petrochem Co.) Aug. 30, 1994.

Database WPI—Class A28, AN 87–172964, XP002058752 & JP62103132A (Nichias Corp.) May 13, 1987.

Primary Examiner—Edward J. Cain
(74) Attorney, Agent, or Firm—Synnestvedt & Lechner LLP

(57) ABSTRACT

Sealing material comprises from 45% to 90% by weight exfoliated graphite, from 5% to 20% by weight thermosetting resin and from 5% to 50% by weight fibrous filler which is heat resistant at 250° C. The fibrous filler has fibres at least 90% of which have a fibre length of less than 200 $\mu$m, and an aspect ratio of less than 10:1.

11 Claims, No Drawings

SEALING MATERIAL

The invention relates to a sealing material comprising exfoliated graphite, thermosetting resin, and a fibrous filler.

Sealing materials comprising exfoliated graphite have been used as cylinder head gaskets and other types of seals in internal combustion engines, such as automobile engines for some time, since they have good heat resistance and stress relaxation properties. Graphite sheets have been found to have poor resistance to oil, and this has restricted their use. Means have been sought to improve the oil resistance of graphite sheets. Japanese patent application number 63-72780 relates to a graphite sheet which has expanded graphite particles, heat-resistant fibres, and an organic high-polymer binder as principal components. The graphite sheets produced are said to have improved oil resistance and antifreeze resistance. Heat-resistant inorganic fibres such as rockwool, ceramic fibres, silicate fibres and surface-treated silicate fibres or heat-resistant organic fibres such as aromatic polyamide fibres and phenolic resin fibres can be used as the heat-resistant fibres. The length of the heat-resistant fibres is said to be about 1–50 mm, and the thickness from 10–300 $\mu$m.

In use, when a sealing material comprising exfoliated graphite is under pressure, extrusion of the material may occur jeopardizing the seal. This occurs considerably more easily when the graphite is oil-soaked than in an oil-free environment. Since such extrusion is an undesirable characteristic, it is desirable that extrusion of sealing material is avoided at pressures ordinarily experienced by them in oily environments. The pressure at which extrusion occurs (the extrusion collapse point) should be above such pressures.

According to the present invention, there is provided sealing material characterised in that the material comprises from 45–90% by weight exfoliated graphite, from 5 to 20% by weight thermosetting resin, and from 5 to 50% by weight fibrous filler which is heat resistant at 250° C., the fibrous filler having fibres at least 90% of which have a fibre length of less than 200 $\mu$m, and an aspect ratio of less than 10:1.

It has surprisingly been found that sealing materials comprising fibrous fillers with the short fibre lengths and aspect ratios of the present invention have considerably higher extrusion collapse points than sealing elements of graphite foil comprising exfoliated graphite alone, than graphite foil with phenolic resin, or than graphite foil comprising phenolic resin and fibrous fillers having fibre lengths of similar size to those described in JP 63 72780. In some embodiments, the sealing material is in the form of a sheet or layer, for example, of a planar gasket such as an automotive head gasket.

In other embodiments the sealing material is in the form of a moulded shape, such as a shaft sealing ring.

A sealing material according to the invention may comprise from 5 to 20% by weight of the thermosetting resin, and from 5 to 30% by weight of the fibrous filler.

Conveniently, the thermosetting resin is a phenolic resin.

When a filler is used in which at least 90% of the fibres of the fibrous filler have a fibre length of less than 20 $\mu$m, a further increase in the extrusion collapse point is found, and so it is preferred to use fibres of this length. Use of a fibrous filler at least 90% of the fibres of which have a fibre length of less than 10 $\mu$m is more preferable.

Advantageously, the aspect ratio of the fibrous filler is less than 6:1.

The exfoliated graphite is mixed with the fibrous filler (and, optionally, the powdered thermosetting resin) in the dry state, eg by gentle tumbling or in the airborne state. A layer of the mixture is then compacted, usually by passage between rollers, to form a coherent foil or sheet. Alternatively, the mixture may be compacted to other shapes eg sealing rings. Such other shapes may also be made by re-moulding foil.

When the resin is added as a free-flowing powder, it may subsequently be made to flow, prior to cross-linking, by heating the consolidated foil (optionally under pressure). Further heating, normally to a higher temperature, then cross-linking the resin.

Alternatively, the powdered resin can be made to distribute itself more effectively through the foil by soaking in solvent and then drying.

A preferred method of introducing resin is to initially compress the exfoliated graphite to a relatively low density (eg 0.5 kg m$^{-3}$) so that some porosity is maintained. Liquid resin (solution or suspension in water, etc) is then allowed to soak in. After drying, the low density foil is compressed further to achieve the required final density.

The graphite sheet preferably has a final density of from 0.7 to 1.5 kg m$^{-3}$. Final densities of less than 0.7 are too weak and compressible. Densities of over 1.5 tend to be too hard and incompressible, giving a poor seal.

A particularly preferred fibrous filler is wollastonite the fibre length of which falls within the ranges of the present invention.

In addition to increasing the stress at which extrusion begins, shorter fibres and lower aspect ratios make it easier to mix the fibrous filler with the exfoliated graphite. This gives a more homogeneous product, which may contribute to improved performance.

A particular application of the sealing element of the present invention is used in a multi-layer steel gasket in the form of a thin coating on the gasket to fill fissures. Typically, such a sealing element will be in the range from 50 to 100 $\mu$m thick, preferably approximately 75 $\mu$m thick.

In another application of the sealing element, a graphite layer or sheet from 0.5 to 2 mm thick may be provided which acts to provide resilience in a gasket.

COMPARATIVE EXAMPLE 1

Graphite foil having a thickness of approximately 200 $\mu$m was formed by conventional means from expanded graphite. The graphite foil was consolidated by passing through calenders to achieve a foil thickness of 75 $\mu$m and a final density of 1.4 kg m$^{-3}$.

COMPARATIVE EXAMPLE 2

Graphite foil having a final thickness of approximately 200 $\mu$m as formed in the first stage of comparative example 1 but with an intermediate density of 0.5 kg m$^{-3}$ was impregnated with approximately 10% phenolic resin by first passing the foil through a bath containing a resole phenolic resin, Borden SC1008 resin in methyl isobutylketone solvent, and then by drying in an oven. The resin-impregnated graphite foil was then further consolidated as in comparative example 1.

COMPARATIVE EXAMPLE 3

Graphite foil comprising approximately 10% by weight of mica was formed as in comparative examples 1 and 2 except that 10% of mica was added to the graphite prior to the expansion stage in the furnace. The foil was then impregnated and consolidated as in comparative example 2.

COMPARATIVE EXAMPLES 4 and 5

Comparative example 3 was repeated except that the graphite foil comprised (in Comparative Example 4) 10% of Nygloss wollastonite having a median fibre length of 0.25 mm or (in Comparative Example 5) Franklin Fibre (calcium sulphate ex Franklin Institute with a length of about 1 mm) instead of Mica. When it was attempted to make a graphite foil of 75 μm thickness, the fibres coagulated and a foil was unable to be formed. The product was weak and inhomogeous and would not form a satisfactory seal.

There now follow examples 1 to 6 which are illustrative of the present invention.

EXAMPLE 1

Comparative example 3 was repeated except that the graphite foil comprised 10% of wollastonite instead of mica.

The wollastonite incorporated was Wollastocoat 10 (from Nyco minerals), having an aspect ratio of 3:1, a median fibre length of 3 μm, 96% of the fibres having a length below 10 μm.

EXAMPLE 2

Example 1 was repeated except that the wollastonite was Nyad 400 (from Nyco minerals) having an aspect ratio of 5:1 and a median fibre length of approximately 25 μm.

EXAMPLE 3

Example 1 was repeated except that the wollastonite was Vansil EW10 (from Vanderbilt, UK distributor, Microfine Minerals), having an aspect ratio of between 5:1 and 10:1, a median fibre length of approximately 32 μm, 97% of the fibres having a length below 63 μm, and 40% below 20 μm.

EXAMPLE 4

Example 1 was repeated except that the wollastonite fibres formed 22% by weight and the final density was 1.1.

EXAMPLE 5

Example 1 was repeated except that the wollastonite fibres formed 24% by weight and the phenolic resin formed 18% by weight. The final density was 1.4.

EXAMPLE 6

Example 1 was repeated except that the wollastonite fibres formed 24% by weight and the phenolic resin formed 9% by weight. The final density was 1.4.

Tests were carried out on the products of the foils produced in the examples and the comparative examples as follows.

Each foil sample was soaked in a standard oil (ASTM oil 3) at 150° C. for 5 hours. The foils were then subjected to pressure, to find their extrusion collapse points, that is the pressure at which extrusion occurs after the foils have been soaked in oil.

The results were as follows:

|  | Extrusion collapse point (MPa) |
|---|---|
| Comparative Example 1 | 85 |
| Comparative Example 2 | 87 |
| Comparative Example 3 | 87 |
| Comparative Examples 4 and 5 | could not be determined |
| Example 1 | 122 |
| Example 2 | 99 |
| Example 3 | 98 |
| Example 4 | 164 |
| Example 5 | 186 |
| Example 6 | 155 |

This shows that the inclusion of the wollastonite of short fibre length as in examples 1 to 6 significantly raises the extrusion collapse point in this test.

What is claimed is:

1. Sealing material wherein the material comprises from 45–90% by weight exfoliated graphite, from 5 to 20% by weight thermosetting resin, and from 5 to 50% by weight fibrous filler which is heat resistant at 250° C., the fibrous filler having fibres at least 90% of which have a fibre length of less than 200 μm, and an aspect ratio of less than 10:1.

2. Sealing material according to claim 1, wherein the material comprises from 5 to 20% by weight of the thermosetting resin, and from 5 to 30% by weight of the fibrous filler.

3. A sealing material as claimed in claim 1, wherein the thermosetting resin is a phenolic resin.

4. A sealing material as claimed in claim 1, wherein at least 90% of the fibres of the fibrous filler have a fibre length of less than 20 μm.

5. A sealing material as claimed in claim 4, wherein at least 90% of the fibres of the fibrous filler have a fibre length of less than 10 μm.

6. A sealing material as claimed in claim 1, wherein the aspect ratio of the fibres of the fibrous filler is less than 6:1.

7. A sealing material as claimed in claim 1, wherein the fibrous filler is wollastonite.

8. A sealing material as claimed in claim 1, wherein the sealing material is in the form of a sheet or layer.

9. A sealing material as claimed in claim 8, wherein the sheet or layer has a thickness of from 50 μm to 100 μm.

10. A sealing material as claimed in claim 1, wherein the sealing material is in the form of a moulded shape.

11. A sealing material as claimed in claim 1, wherein the sealing material has a density of from 0.7 to 1.5 kgm$^{-3}$.

* * * * *